(12) United States Patent
Kim (10) Patent No.: US 8,485,597 B2
(45) Date of Patent: Jul. 16, 2013

(54) ANGLE ADJUSTMENT DEVICE FOR BICYCLE SADDLE

(76) Inventor: Chun Choo Kim, Seoul (KR)

(*) Notice: Subject to any disclaimer, the term of this patent is extended or adjusted under 35 U.S.C. 154(b) by 0 days.

(21) Appl. No.: 12/994,854

(22) PCT Filed: Feb. 16, 2010

(86) PCT No.: PCT/KR2010/000942
§ 371 (c)(1),
(2), (4) Date: Nov. 27, 2010

(87) PCT Pub. No.: WO2011/102562
PCT Pub. Date: Aug. 25, 2011

(65) Prior Publication Data
US 2011/0254329 A1    Oct. 20, 2011

(51) Int. Cl.
*B62J 1/08* (2006.01)
(52) U.S. Cl.
USPC .................................. 297/215.15; 297/195.1
(58) Field of Classification Search
USPC ............. 297/215.15, 215.13, 195.1; 280/274, 280/281.1; 403/91, 92, 93, 96, 99, 104, 106, 403/108
See application file for complete search history.

(56) References Cited

U.S. PATENT DOCUMENTS

| | | | | | |
|---|---|---|---|---|---|
| 1,679,533 | A | * | 8/1928 | Kupsche | 343/866 |
| 5,163,735 | A | * | 11/1992 | Aljundi | 297/378.11 |
| 5,441,327 | A | * | 8/1995 | Sanderson | 297/195.1 |
| 7,059,672 | B2 | * | 6/2006 | Saccucci | 297/195.1 |
| 2010/0194156 | A1 | * | 8/2010 | Kim | 297/215.15 |

FOREIGN PATENT DOCUMENTS

| | | |
|---|---|---|
| JP | 11-301542 | 11/1999 |
| KR | 1019980056842 | 12/1998 |
| KR | 2020000028788 | 10/2000 |
| KR | 1020080011811 | 2/2008 |

* cited by examiner

*Primary Examiner* — David Dunn
*Assistant Examiner* — Timothy J Brindley
(74) *Attorney, Agent, or Firm* — Christopher Paul Mitchell (57) ABSTRACT

The present invention provides an angle adjustment device for a bicycle saddle which can adjust the angle of the saddle even when the bicycle is moving. The angle adjustment device includes a movable unit (110), a stationary unit (120) and a locking unit (130). The movable unit is coupled to the saddle. The stationary unit is coupled to the movable unit and rotatably supports the movable unit when the angle of the bicycle saddle is adjusted. The locking unit releasably holds the movable unit, so that when the locking unit releases the movable unit, the movable unit is allowed to rotate and adjust the angle of the bicycle saddle, and when the locking unit holds the movable unit, the movable unit is prevented from rotating so as to maintain the angle of the bicycle saddle.

4 Claims, 10 Drawing Sheets

ANGLE ADJUSTMENT DEVICE FOR BICYCLE SADDLE

RELATED APPLICATIONS

This application is a 371 application of International application No. PCT/KR2010/000942, filed Feb. 16, 2010, which is incorporated herein by reference in its entirety.

TECHNICAL FIELD

The present invention relates, in general, to angle adjustment devices for bicycle saddles and, more particularly, to an angle adjustment device which can adjust the angle of a bicycle saddle even when the bicycle is moving, and includes a movable unit coupled to the bicycle saddle to adjust the angle of the bicycle saddle, a stationary unit coupled to the movable unit to rotatably support the movable unit when the angle of the bicycle saddle is adjusted, and a locking unit maintaining the angle of the bicycle saddle.

BACKGROUND ART

Generally, bicycles are moved forwards in such a way as to rotate wheels using the force generated when a user pushes the pedals. In a wide meaning, the word bicycles include three or four-wheeled bicycles and bicycles, such as water bicycles, ice bicycles, etc., which are used on places other than the ground. The bicycles have been widely used as a representative means of transportation which is operated by manual force. In particular, recently, bicycles are used in various manners, for example, as exercise devices for improving the health or as a means for recreation. Furthermore, the demand for bicycles has increased due to their environment-friendly characteristics.

Typically, such a bicycle includes wheels, a frame, pedals, a chain, a saddle and a handlebar. Most bicycles have a saddle height adjustment unit which is provided on the junction between the saddle and the frame. Thus, to ensure the stability of a user who sits on the saddle, the height of the saddle can be adjusted depending on the height of the user such that his/her feet can be appropriately put on the pedals.

As such, in the case of conventional bicycles, the saddle can be adjusted in height such that the distance between the feet of the user and the pedals can be adjusted. However, users have a variety of body types. Even though the users have the same height and leg length, the lengths of the upper bodies or arms differ from each other. That is, in the case where the legs of the user are longer than the average for humans of the same arm length, even if the height of the saddle is set suitable for the length of the legs of the user, the user may not easily hold the handlebar. Conversely, if the legs of the user are relatively short, because the arms must be bent when the user holds the handlebar, it is very uncomfortable, particularly, when riding the bicycle for a long time. Furthermore, the above problems are further aggravated because the user cannot adjust the angle of the saddle while the bicycle is moving.

In addition, when the bicycle is going up or down a slope, the user is inclined forwards or rearwards with respect to the bicycle. In the case where the angle of the saddle is fixed, because it is uncomfortable to sit on the saddle, generally, the user stands up. However, as such, when the user stands up, because his/her weight is applied only to the pedals, the stability is deteriorated and the probability of an accident increases. Moreover, if the bicycle goes up or down the slope for a long time, because the user must maintain the standing up position for that time, the fatigue of the user is increased.

As described above, in the conventional techniques, the angle of the saddle cannot be adjusted when the bicycle is moving. Therefore, if the user is uncomfortable when riding the bicycle, he/she must stop the bicycle and get off to adjust the angle of the saddle, which is inconvenient for the user.

DISCLOSURE OF INVENTION

Technical Problem

Accordingly, the present invention has been made keeping in mind the above problems occurring in the prior art, and an object of the present invention is to provide an angle adjustment device for a bicycle saddle which is provided on an upper end of a saddle support frame which can adjust the height of the saddle and is constructed such that the angle of the saddle can be adjusted even when the bicycle is moving, so that the saddle can be oriented at an appropriate angle corresponding to the positions of pedals and a handlebar according to the body type of a user or a place where the bicycle is moving, even when the bicycle is in motion.

Solution to Problem

In order to accomplish the above object, in an aspect, the present invention provides an angle adjustment device for a bicycle saddle, including: a movable unit coupled to the bicycle saddle to adjust an angle of the bicycle saddle; a stationary unit coupled to the movable unit by a coupling shaft, the stationary unit rotatably supporting the movable unit when the angle of the bicycle saddle is adjusted; and a locking unit releasably holding the movable unit, so that when the locking unit releases the movable unit, the movable unit is allowed to be rotated to adjust the angle of the bicycle saddle, and when the locking unit holds the movable unit, the rotation of the movable unit is prevented so as to maintain the angle of the bicycle saddle.

The angle adjustment device may further include a support base coupled to a lower end of the stationary unit to support the stationary unit.

Furthermore, a circular plate may be provided on a lower end of the movable unit. A toothed part may be formed on a portion of a periphery of the circular plate, so that the movable unit is held by the locking unit using the gear teeth such that the angle of the bicycle saddle is maintained.

In addition, a circular plate may be provided on an upper end of the stationary unit. A toothed part may be formed on a portion of a periphery of the circular plate of the stationary unit.

As well, an elastic means may be coupled to the coupling shaft of the stationary unit and both ends of the locking unit, so that when an external force is applied to the locking unit, the locking unit is moved away from the movable unit while overcoming elastic force of the elastic means, thus releasing the movable unit to allow the movable unit to rotate, and when the external force is removed, the locking unit is moved to an original position thereof by the elastic force of the elastic means, thus holding the movable unit to prevent the movable unit from rotating.

Preferably, the elastic means may comprise a spring.

In another aspect, the present invention provides an angle adjustment device for a bicycle saddle, including: a movable unit having an angle adjustment gear, with gear teeth formed on a periphery of the angle adjustment gear, and a pulley coupled to the angle adjustment gear, with a wire wrapped around the pulley, so that when an external force is applied to the wire, the angle adjustment gear is rotated and moved in one direction; a stationary plate having on an upper end thereof gear teeth engaging with the angle adjustment gear of the movable unit, the gear teeth of the stationary plate providing a track along which the angle adjustment gear of the movable unit is moved; a locking unit coupled to the movable unit, the locking unit having fastening means for releasably holding the gear teeth of the stationary plate to maintain an angle of the bicycle saddle or to allow the angle of the bicycle saddle to be adjusted; and a support frame comprising: a lower support frame body supporting the stationary plate at a predetermined position; and an upper support frame body support the movable unit at a predetermined position, so that an angle of the upper support frame body with respect to the lower support frame body changes depending on the rotation of the angle adjustment gear of the movable unit.

Furthermore, when an external force is applied to the locking unit, the fastening means of the locking unit may be locked to or removed from the gear teeth of the stationary plate.

In addition, an elastic means may be coupled to the movable unit and the stationary plate, so that adjustment of the angle of the bicycle saddle with respect to one direction is conducted by elastic force of the elastic means.

Moreover, the elastic means may preferably comprise a spring.

Advantageous Effects of Invention

In the present invention, an angle adjustment device for bicycle saddles is provided on an upper end of a saddle support frame which can adjust the height of the saddle. The angle adjustment device according to the present invention can adjust the angle of the saddle even when the bicycle is moving.

In particular, when the bicycle goes up or down a slope, because the orientation of the saddle can be adjusted to an appropriate angle depending on the inclination of the slope even when the bicycle is in motion, a user can maintain the state in which he/she comfortably sits on the saddle while riding on the slope.

BEST MODE FOR CARRYING OUT THE INVENTION

Hereinafter, preferred embodiments of an angle adjustment device for a bicycle saddle according to the present invention will be described in detail with reference to the attached drawings.

Figure 2:
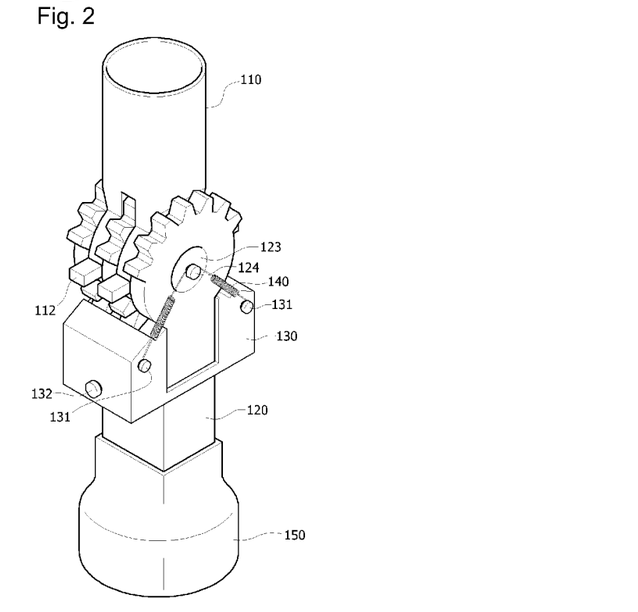
FIG. 2 is a perspective view of the angle adjustment device for bicycle saddles according to the first embodiment of the present invention.
Figure 3:
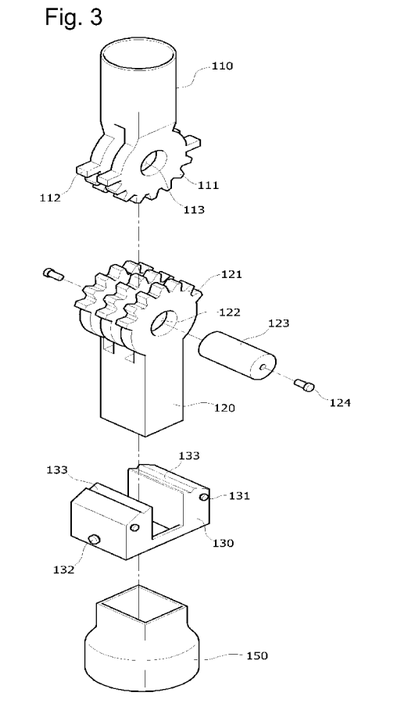
FIG. 3 is an exploded perspective view illustrating the angle adjustment device according to the first embodiment.

FIG. 2 is a perspective view of the angle adjustment device for bicycle saddles according to a first embodiment of the present invention. FIG. 3 is an exploded perspective view illustrating the angle adjustment device according to the first embodiment. As shown in FIGS. 2 and 3, the angle adjustment device according to the first embodiment of the present invention includes a movable unit 110, a stationary unit 120, a locking unit 130, elastic springs 140 and a support base 150.

The movable unit 110 has an upper portion having a hollow cylindrical rod shape. Two circular plates are provided on a lower portion of the movable unit 110. An angle adjustment toothed part 111 is formed on a portion of the periphery of each circular plate. Stoppers 112 are provided at predetermined positions on the periphery of each circular plate of the movable unit 110 to prevent the angle of the bicycle saddle from being excessively changed. A first insert hole 113 is formed through the central portions of the circular plates. A coupling shaft 123 is inserted through the first insert hole 113.

The stationary unit 120 has a lower portion having a hollow square rod shape. Three circular plates are provided on an upper portion of the stationary unit 120. A locking toothed part 121 is formed on the periphery of each circular plate of the stationary unit 120. A second insert hole 122 through which the coupling shaft 123 is inserted is formed through the central portions of the circular plates of the stationary unit 120.

The coupling shaft 123 has a cylindrical rod shape and is inserted through the first insert holes 113 of the movable unit 110 and the second insert holes 122 of the stationary unit 120. Bolt holes are formed in both ends of the coupling shaft 123. An internal thread is formed on the inner surface of each bolt hole. A spring support bolt 124 is tightened into each bolt hole of the coupling shaft 123. Looped parts which are formed on the elastic springs 140 are coupled to the corresponding spring support bolts 124.

The locking unit 130 has a hollow space having a square pillar shape in the central portion thereof. Locking portions 133 are respectively formed on the upper surfaces of both ends of the locking unit 130. Bolt holes are formed in opposite sidewalls of the locking unit 130. An internal thread is formed on the inner surface of each bolt hole of the locking unit 130. A spring support bolt 131 is tightened into each bolt hole of the locking unit 130. A locking bolt hole having an internal thread is formed in one end of the locking unit 130. A wire connection bolt 132 is tightened into the locking bolt hole.

The support base 150 has an upper portion having a hollow square pillar shape. The lower portion of the stationary unit 120 is inserted into the upper portion of the support base 150. A lower portion of the support base 150 has a hollow cylindrical shape.

As shown in FIG. 2, the movable unit 110 is coupled to the stationary unit 120 by the coupling shaft 123. The spring support bolts 124 are tightened into both ends of the coupling shaft 123. The looped parts formed on the elastic springs 140 are coupled to the corresponding spring support bolts 124. The locking unit 130 is coupled over the lower portion of the stationary unit 120. Thereafter, the support base 150 is fitted over the lower portion of the stationary unit 120.

Figure 4:
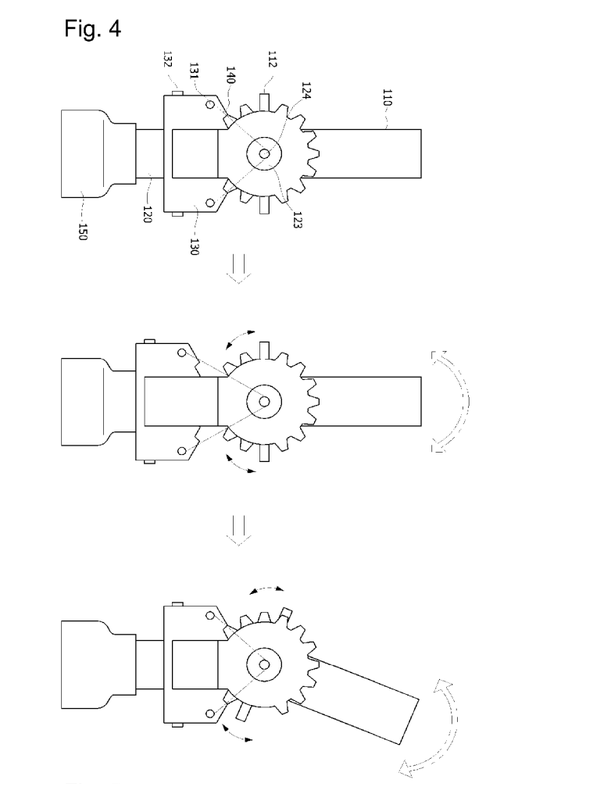
FIG. 4 is of views showing the operation of a movable unit and a locking unit of the angle adjustment device to adjust the angle of the saddle according to the first embodiment.

FIG. 4 is of views showing the operation of the movable unit 110 and the locking unit 130 of the angle adjustment device to adjust the angle of the saddle according to the first embodiment.

Figure 5:
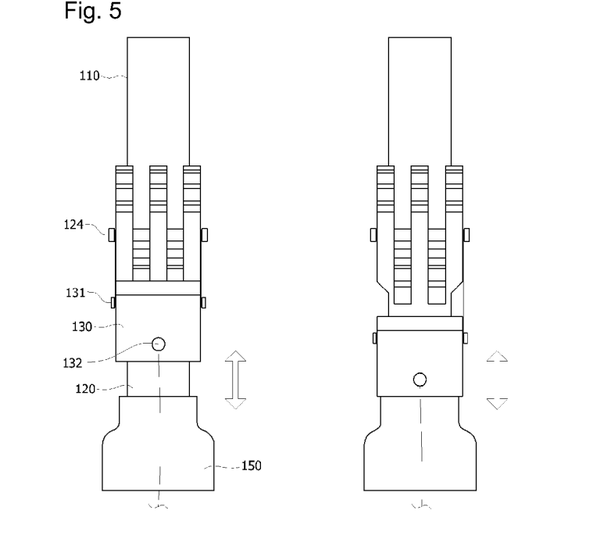
FIG. 5 is of views showing the operation of moving the locking unit upwards and downwards during the process for adjusting the angle of the saddle using the angle adjustment device according to the first embodiment.

FIG. 5 is of views showing the operation of moving the locking unit 130 upwards and downwards during the saddle angle adjustment process of the angle adjustment device according to the first embodiment. As shown in FIGS. 4 and 5, when the locking unit 130 is moved downwards, the movable unit 110 enters a state of being rotatable with respect to the stationary unit 120. After the angle of the movable unit 110 with respect to the stationary unit 120 is appropriately adjusted, the locking unit 130 is moved upwards such that the movable unit 110 is maintained at the adjusted angle.

Figure 1:
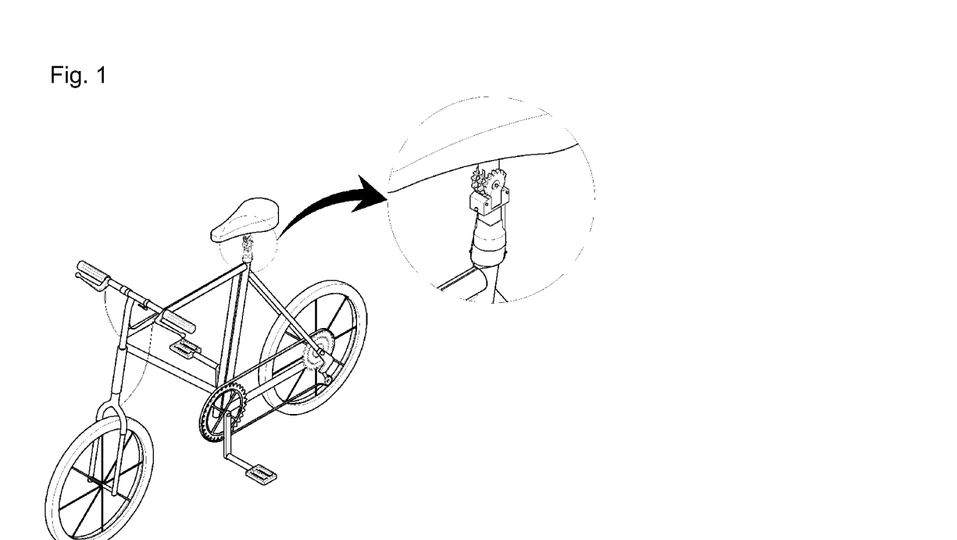
FIG. 1 is a perspective view of a bicycle having an angle adjustment device for bicycle saddles, according to a first embodiment of the present invention.

FIG. 1 is a perspective view showing a bicycle having the angle adjustment device according to the first embodiment. As shown in FIG. 1, when a user pulls a saddle angle adjustment handle while the bicycle is moving, the pulling force is transmitted to a wire which is connected at a first end thereof to the saddle angle adjustment handle. Because a second end of the wire is connected to the wire connection bolt 132 of the locking unit 130, the pulling force is transmitted to the locking unit 130 through the wire. Thereby, the locking unit 130 is moved downwards. When the pulling force is removed, the locking unit 130 is moved upwards to its original position by the elastic force of the elastic springs 140.

Figure 6:
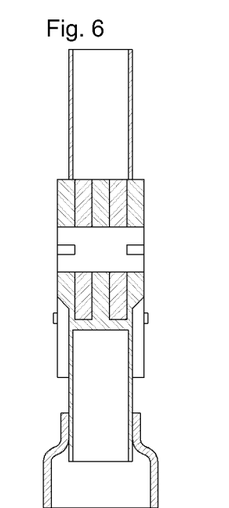
FIG. 6 is a sectional view of the angle adjustment device for bicycle saddles according to the first embodiment.

FIG. 6 is a sectional view of the angle adjustment device for bicycle saddles according to the first embodiment.

Figure 7:
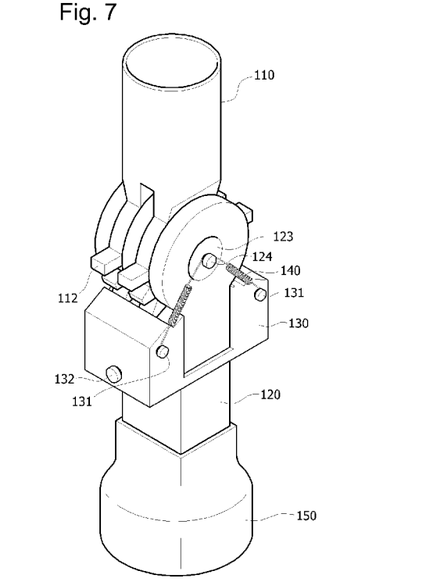
FIG. 7 is a perspective view illustrating an angle adjustment device for bicycle saddles according to a second embodiment of the present invention.
Figure 8:
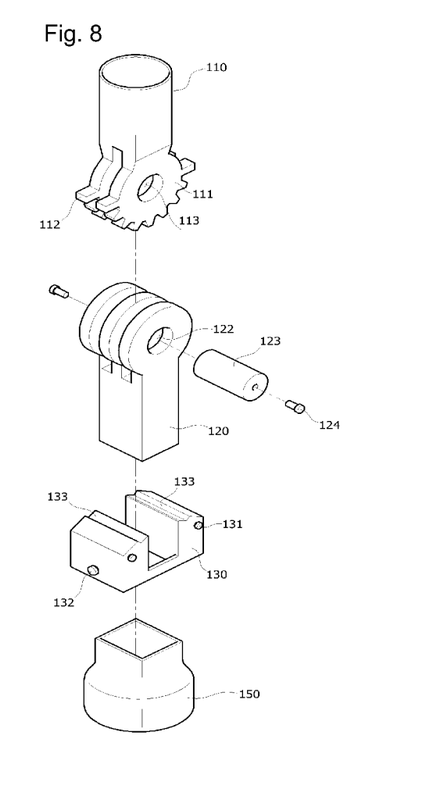
FIG. 8 is an exploded perspective view illustrating the angle adjustment device according to the second embodiment.
Figure 9:
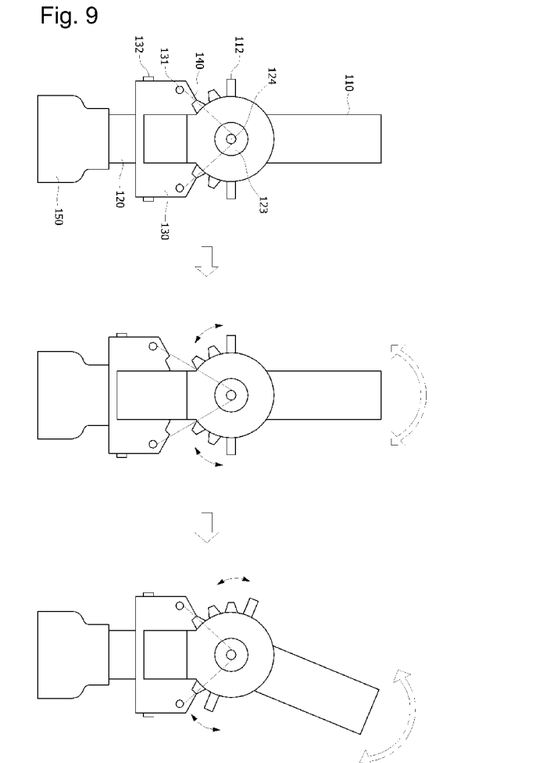
FIG. 9 is of views showing the operation of a movable unit and a locking unit of the angle adjustment device to adjust the angle of the saddle according to the second embodiment.
Figure 10:
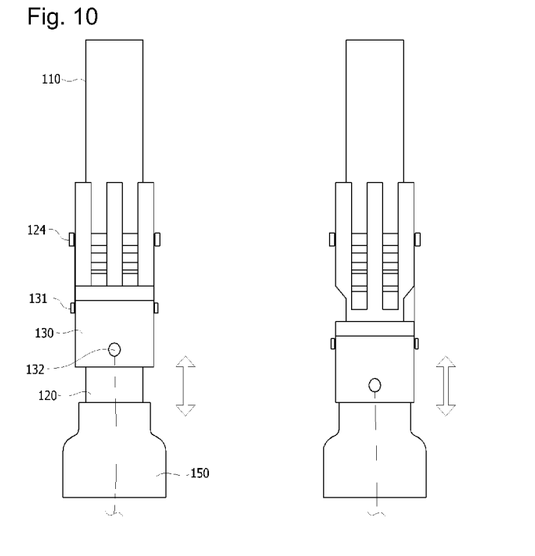
FIG. 10 is of views showing the operation of moving the locking unit upwards and downwards during the process for adjusting the angle of the using the angle adjustment device according to the second embodiment.
Figure 11:
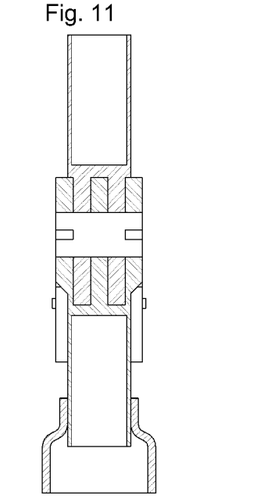
FIG. 11 is a sectional view of the angle adjustment device for bicycle saddles according to the second embodiment.

Meanwhile, FIG. 7 is a perspective view illustrating an angle adjustment device for bicycle saddles according to a second embodiment of the present invention. FIG. 8 is an exploded perspective view illustrating the angle adjustment device according to the second embodiment. FIG. 9 is of views showing the operation of a movable unit and a locking unit of the angle adjustment device to adjust the angle of the saddle according to the second embodiment. FIG. 10 is of views showing the operation of moving the locking unit upwards and downwards during the saddle angle adjustment process of the angle adjustment device according to the second embodiment. FIG. 11 is a sectional view of the angle adjustment device for bicycle saddles according to the second embodiment.

In the second embodiment, each of the circular plates of a stationary unit 120 has no locking toothed part 121 on the periphery thereof. The general construction of the angle adjustment device according to the second embodiment, except for this structure, remains the same as that of the first embodiment, therefore further explanation is deemed unnecessary.

Figure 13:
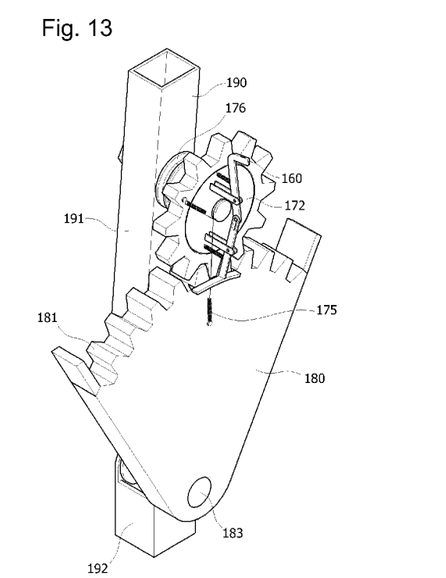
FIG. 13 is a perspective view illustrating the angle adjustment device for bicycle saddles according to the third embodiment of the present invention.
Figure 14:
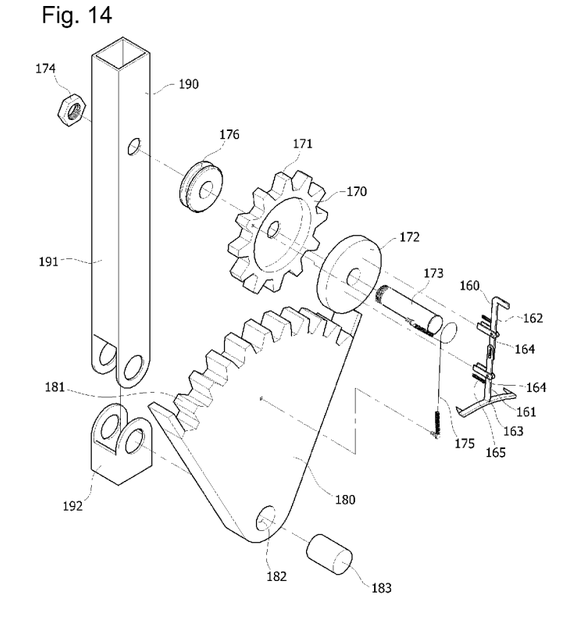
FIG. 14 is an exploded perspective view illustrating the angle adjustment device according to the third embodiment.

FIG. 13 is a perspective view illustrating an angle adjustment device for a bicycle saddle according to a third embodiment of the present invention. FIG. 14 is an exploded perspective view illustrating the angle adjustment device according to the third embodiment. Referring to FIGS. 13 and 14, the angle adjustment device according to the third embodiment includes a locking unit 160, a movable unit 170, a stationary plate 180 and a support frame 190.

The locking unit 160 is constructed such that after the angle of the saddle is adjusted by rotation of an angle adjustment gear 171 of the movable unit 170, the locking unit 160 is locked to stationary plate gear teeth 181 of the stationary plate 180 to retain the saddle at the adjusted angle. The locking unit 160 includes a I-shaped bar 161 which has fastening protrusions 163 on opposite sides of a first end thereof. The I-shaped bar 161 is connected at a second end thereof to a first end of the L-shaped bar 161. In detail, a portion of the first end of the L-shaped bar 162 overlaps a portion of the second end of the I-shaped bar 161. A slot is formed through each of the overlapped portions of the I-shaped bar 161 and the L-shaped bar 162. The overlapped portions of the I-shaped bar 161 and the L-shaped bar 162 are connected to each other by a pin inserted through the slots of the overlapped portions. Furthermore, two support bars 164 are coupled to predetermined portions of each of the I-shaped bar 161 and the L-shaped bar 162 by a pin which is inserted both through the corresponding portion of the bar 161, 162 and through holes formed through the ends of the two support bars 164. Hereby, each of the I-shaped bar 161 and the L-shaped bar 162 is rotatably supported by the corresponding two support bars 164. In addition, a spring 165 is coupled to each of the I-shaped bar 161 and the L-shaped bar 162 at a position adjacent to the junction between the bar 161, 162 and the two support bars 164. The locking unit 160 is fastened to one surface of a disc 172 which is coupled to the angle adjustment gear 171. Thus, even though the angle adjustment gear 171 rotates, the locking unit 160 can be maintained parallel to the support frame 190.

The movable unit 170 functions to change the angle of the bicycle saddle. The movable unit 170 includes the angle adjustment gear 171, the disc 172, a pulley 176, an adjustment spring 175 and a support shaft 173. The angle adjustment gear 171 has a cylindrical depression therein. Gear teeth are formed on the circumferential outer surface of the angle adjustment gear 171. The disc 172 has a passing hole through which the support shaft 173 is inserted. The disc 172 is coupled to the angle adjustment gear 171 such that the angle adjustment gear 171 is rotatable around the support shaft 173. The pulley 176 has a groove around the circumferential outer surface thereof. A rotating wire is wrapped around the pulley 176 along the groove. The pulley 176 is rotated by external force transmitted thereto through the rotating wire, thus rotating the angle adjustment gear 171. The adjustment spring 175 is fastened at a first end thereof to the stationary plate 180 and fastened at a second end thereof to the angle adjustment gear 171. Thus, when the angle adjustment gear 171 is rotated by external force transmitted through the pulley 176, the adjustment spring 175 is extended. When the external force is removed, the adjustment spring 175 is returned to its original state by the elastic force, thus rotating the angle adjustment gear 171 in the reverse direction. The support shaft 173 is inserted through holes which are formed through the angle adjustment gear 171, the disc 172, the pulley 176 and the upper portion of an upper support frame body. A fastening nut 174 is tightened over the end of the support shaft 173. Thereby, the elements of the movable unit 170 are integrally assembled with each other.

In detail, the stationary plate 180 has a sectorial shape. The gear teeth are formed on the periphery of the upper portion of the stationary plate 180. A plate fastening hole 182 is formed through the lower portion of the stationary plate 180. A plate fastening shaft 183 is inserted into the plate fastening hole 182. The gear teeth of the stationary plate 180 engage with the angle adjustment gear 171 to allow the adjustment of the angle of the bicycle saddle or be maintained at the adjusted angle.

The support frame 190 includes the upper support frame 191 and a lower support frame body 192. A lower portion of the lower support frame body 192 has a hollow square pillar shape. Semicircular extensions are provided on the ends of opposite sidewalls of the upper end of the lower support frame body 192. Coupling holes through which the plate fastening shaft 183 is inserted are formed through the semi-circular extensions of the lower support frame body 192. The stationary plate 180 is fastened to the support frame 190 by coupling the plate fastening shaft 183 into the coupling holes. The upper support frame body 191 has a hollow square pillar shape. Semicircular extensions are provided on the ends of opposite sidewalls of the lower end of the upper support frame body 191. Coupling holes through which the plate fastening shaft 183 is inserted are formed through the semicircular extensions of the upper support frame body 191. Furthermore, the hole through which the support shaft 173 is inserted is formed at a predetermined position through the upper portion of the upper support frame body 191. As such, the movable unit 170 is coupled to the hole of the upper support frame body 191, so that the angle of the upper support frame body 191 with respect to the lower support frame body 192 around the plate fastening shaft 183 can be varied depending on the rotation of the angle adjustment gear 171.

Figure 15:
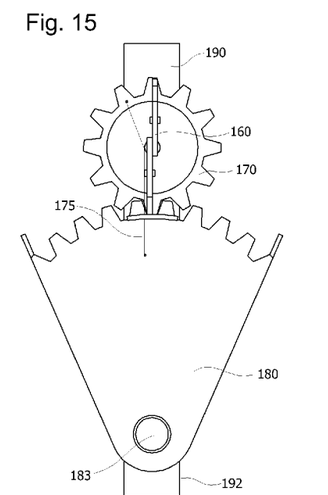
FIG. 15 is a view showing a locked state of the angle adjustment device according to the third embodiment.
Figure 16:
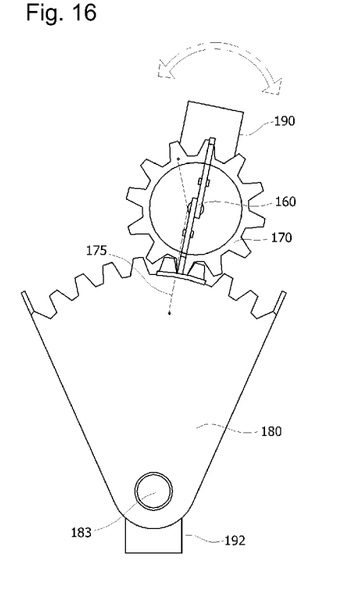
FIG. 16 is a view showing the operation of the angle adjustment device which is in a state in which the adjustment of the angle of the saddle is accomplished by controlling a locking unit according to third embodiment.

FIG. 15 is a view showing a locked state of the angle adjustment device according to the third embodiment. FIG. 16 is a view showing the operation of the angle adjustment device which is in a state in which the adjustment of the angle of the saddle is made possible by controlling the locking unit 160. As shown in these drawings, the angle of the upper support frame body 191 with respect to the lower support frame body 192 can be varied by the rotation of the angle adjustment gear 171 which engages with the stationary plate gear teeth 181. Here, when the angle adjustment gear 171 is moved forwards by external force to change the angle of the bicycle saddle, the adjustment spring 175 is extended. When the external force which has been applied to the angle adjustment gear 171 is removed, the adjustment spring 175 is contracted by elastic force so that the angle adjustment gear 171 is moved backwards to its original position.

Figure 17:
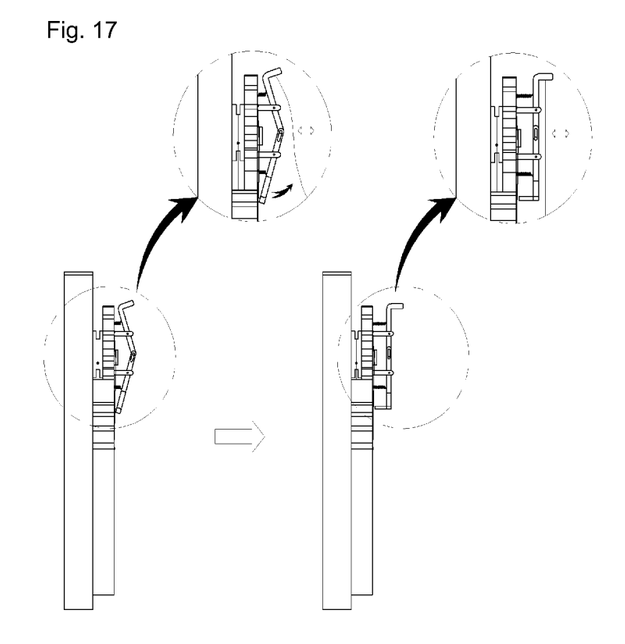
FIG. 17 is of views illustrating the operation of the locking unit for locking the angle of the saddle according to the third embodiment.

FIG. 17 is of views illustrating the operation of the locking unit 160 for maintaining the angle of the saddle. When no external force is applied to the locking unit 160, the springs 165 are maintained in the contracted state. In this state, the locking unit 160 is maintained in the state in which it is bent at the medial portion thereof, such that the fastening protrusions are locked to the stationary plate gear teeth 181. Thereby, the saddle can be maintained in the locked state. When external force is applied to the locking unit 160 through the wire, the medial portion of the locking unit 160 becomes linear and the springs are extended. Thereby, the fastening protrusions are removed from the stationary plate gear teeth 181, thus allowing the angle of the saddle to be adjusted.

Figure 12:
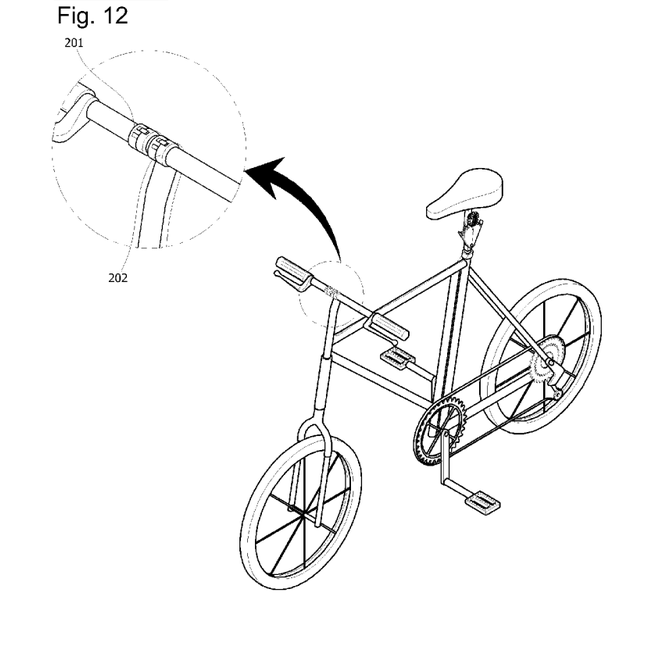
FIG. 12 is a perspective view of a bicycle having an angle adjustment device for bicycle saddles, according to a third embodiment of the present invention.

FIG. 12 is a perspective view of a bicycle having the angle adjustment device according to a third embodiment of the present invention. As shown in FIG. 12, a locking unit controller 201 and an adjustment gear controller 202 which have typical structures are provided on the handle of the bicycle. When a grip of the locking unit controller 201 is rotated forwards, the wire connected to the locking unit 160 is put under tension. Then, the fastening protrusions 163 of the locking unit 160 are removed from the stationary plate gear teeth 181, thus allowing the angle of the saddle to be adjusted. When the grip of the locking unit controller 201 is rotated backwards, the wire connected to the locking unit 160 is loosened. Then, the fastening protrusions 163 are locked to the stationary plate gear teeth 181 by the elastic force of the springs 165 of the locking unit 160, thus maintaining the angle of the saddle.

The adjustment gear controller 202 is connected to the wire wrapped around the pulley 176. When a grip of the adjustment gear controller 202 is rotated forwards, the angle adjustment gear 171 is moved towards the handlebar of the bicycle. When the grip of the adjustment gear controller 202 is rotated backwards, the adjustment spring 175 which has been extended is contracted, so that the angle adjustment gear 171 is moved by the elastic force of the adjustment spring 175 in the direction away from the handlebar of the bicycle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in the present invention, an angle adjustment device for bicycle saddles is provided on an upper end of a saddle support frame which can adjust the height of the saddle. The angle adjustment device according to the present invention can adjust the angle of the saddle even when the bicycle is moving.

In particular, when the bicycle goes up or down a slope, because the orientation of the saddle can be adjusted to an appropriate angle depending on the inclination of the slope even when the bicycle is in motion, a user can maintain the state in which he/she comfortably sits on the saddle while riding on the slope.

The invention claimed is:

1. An angle adjustment device for a bicycle saddle, comprising:
   a movable unit comprising: an angle adjustment gear, with gear teeth formed on a periphery of the angle adjustment gear; and a pulley coupled to the angle adjustment gear, with a wire wrapped around the pulley, so that when an external force is applied to the wire, the angle adjustment gear is rotated and moved in one direction;
   a stationary plate having on an upper end thereof gear teeth engaging with the angle adjustment gear of the movable unit, the gear teeth of the stationary plate providing a track along which the angle adjustment gear of the movable unit is moved;
   a locking unit coupled to the movable unit, the locking unit having fastening means for releasably holding the gear teeth of the stationary plate to maintain an angle of the bicycle saddle or to allow the angle of the bicycle saddle to be adjusted; and a support frame comprising: a lower support frame body supporting the stationary plate at a predetermined position; and an upper support frame body support the movable unit at a predetermined position, so that an angle of the upper support frame body with respect to the lower support frame body changes depending on the rotation of the angle adjustment gear of the movable unit.

2. The angle adjustment device according to claim 1, wherein when an external force is applied to the locking unit, the fastening means of the locking unit is locked to or removed from the gear teeth of the stationary plate.

3. The angle adjustment device according to claim 1, wherein elastic means is coupled to the movable unit and the stationary plate, so that adjustment of the angle of the bicycle saddle with respect to one direction is conducted by elastic force of the elastic means.

4. The angle adjustment device according to claim 3, wherein the elastic means comprises a spring.

* * * * *